United States Patent [19]

Grace

[11] Patent Number: 5,383,742

[45] Date of Patent: Jan. 24, 1995

[54] DIRT AND ROCK REMOVAL APPARATUS FOR VEHICLE TIRES

[76] Inventor: Jimmie D. Grace, 2022 Calle De Los Alamos, San Clemente, Calif. 92672

[21] Appl. No.: 59,360

[22] Filed: May 11, 1993

[51] Int. Cl.$^6$ ............................................. E01C 5/16
[52] U.S. Cl. ...................... 404/15; 404/35; 238/14
[58] Field of Search .................. 404/15, 17, 19, 21, 404/2, 4, 26, 35, 36; 14/73, 2.4; 210/164; 15/104.001, 238; 238/14

[56] References Cited

U.S. PATENT DOCUMENTS

| | | | |
|---|---|---|---|
| 1,574,729 | 2/1926 | Foster | 238/14 |
| 1,720,461 | 7/1929 | Barrett | 404/17 |
| 2,230,506 | 2/1941 | Vissering | 404/21 |
| 2,496,119 | 1/1950 | Cesen | 238/14 |
| 4,376,596 | 3/1983 | Green | 404/35 |
| 4,488,833 | 12/1984 | Perry et al. | 404/35 |
| 4,542,709 | 9/1985 | Spaugh | 404/15 X |
| 4,650,115 | 3/1987 | Fountaine | |

FOREIGN PATENT DOCUMENTS

| | | | |
|---|---|---|---|
| 2636983 | 2/1978 | Germany | 404/35 |
| 0198903 | 8/1989 | Japan | 404/19 |

Primary Examiner—Ramon S. Britts
Assistant Examiner—James A. Lisehora
Attorney, Agent, or Firm—Gary Appel

[57] ABSTRACT

An apparatus for removing dirt and rocks from the tires of trucks and other vehicles comprises a number of elongate rigid metal ribs attached in a transverse direction to a rigid metal plate. The longitudinal spacing between the ribs, taken in conjunction with the height of the ribs relative to the upper surface of the mounting plate prevents the peripheral (i.e., the pavement contacting) surface of a tire rolling over the apparatus in a longitudinal direction from contacting the upper surface of the plate so that dirt and rocks, dislodged from the tire by the tire flexing over the ribs, fall to regions of the plate between the ribs and are not picked up by following ones of the vehicle tires as they roll over the apparatus. The plate, which may be about twelve feet long and about eight feet wide, is preferable constructed in two sections, each about six feet long by about eight feet wide to enhance portability. Pins extend through abutting ribs to detachably connect the two plate sections together.

2 Claims, 3 Drawing Sheets

DIRT AND ROCK REMOVAL APPARATUS FOR VEHICLE TIRES

BACKGROUND OF THE INVENTION

1. Field of the Invention

The present invention relates generally to the field of apparatus used for cleaning truck tires and, more particularly, apparatus for removing dirt, gravel, small rocks or foreign material from tires and tire treads of off-road trucks before the trucks are driven onto public roads and highways.

2. Background Discussion

It is a common occurrence for automobiles frequently driven on public highways and freeways to have their windshields pitted or even cracked by dirt, gravel or small rocks impacting the windshield from vehicles ahead of the automobiles. Although such dirt, gravel or rocks sometimes fall from truck beds or trailers of semi-trucks, they are more often either thrown from the pavement by the vehicle tires or are thrown from the tires, usually truck tires, where they have been lodged in the tire treads. However, even when thrown up from the pavement by vehicle tires, the dirt, gravel and rocks are commonly present on the pavement as a result of being carried onto the roads or highways lodged in truck tires. As can be appreciated, such damage to windshields, in addition to being an annoyance, particularly in the case of new automobiles, results in costly repairs when the windshields are pitted or cracked in a manner adversely affecting the vision of drivers and the windshields have to be replaced. If such replacement is covered by the car owner's automobile insurance, then the insurance premiums may be increased by the insurance company.

Of course, in some instances even a relatively small stone thrown from a truck's tire into the windshield of a following automobile can cause an accident if the impact of the stone against the windshield, which often has a sharp snapping sound like that of a gun shot, causes the driver to flinch and momentarily loose control of his or her automobile. In such an instance, if the truck causing the accident can be identified, the truck owner may be liable for substantial legal damages, especially if it can be proven that a stone or rock from the owner's truck was responsible for an accident.

Because of the serious problems that can be caused by rocks ejected at high speed from vehicle tires, especially truck tires having deep treads, some localities have ordinances requiring trucks that pick up loads off-road (for example, at sand or gravel pits) have dirt and particularly rocks removed from the truck tires before the trucks are permitted on roads and highways. Failure to comply with such ordinances may subject the truck owners to fines if highway patrol officers notice a truck throwing rocks or dirt from their truck tires. Even in the absence of such ordinances, however, drivers of trucks that throw rocks from their tires (or drop rocks from their load) on public highways may be cited by local law enforcement.

Even in the absence of ordinances such as mentioned above and even without worry of being cited, and even where there may be little concern of causing accidents, many truck companies or owners are still concerned about damage to their business or reputation if their trucks drop or discharge rocks and dirt onto public streets and highways.

For these and other reasons, in many localities drivers of trucks that may pick up dirt and rocks in their truck tires have to or want to remove as much dirt and as many rocks as possible from their truck tires. On the other hand, time normally equates to money and going from tire to tire with a manual tool, such as a screwdriver, to pry rocks and stones out of each tire of, for example, an "18 wheeler" or to scrape dirt off tires is a laborious and time consuming task and one that may, accordingly, often be slighted by truck drivers who are in a hurry to deliver a load.

The present inventor has, accordingly invented an apparatus that causes dirt, rocks and stones to be dislodged from truck tires (as well as from other vehicle tires, if needed or required) without an individual having to dislodge individual rocks or stones from the tire treads or scrape dirt from the tires.

SUMMARY OF THE INVENTION

In accordance with the present invention an apparatus is provided for removing dirt, rocks or other foreign material from the tires of trucks and other vehicles. The apparatus comprises a number of elongated rigid ribs and means for attaching the ribs to a mounting surface in spaced-apart manner.

The spacing between the ribs, taken in conjunction with the height of the ribs relative to the mounting surface, is selected to prevent the peripheral surface of a tire rolling over the apparatus in a longitudinal direction from contacting the mounting surface. As tires roll over the ribs, the tire treads are deflected and dirt on and in the tire treads and on adjacent sidewalls, as well as small rocks (for example, gravel) lodged in tread grooves are dislodged and fall onto the mounting surface between the ribs.

According to a preferred embodiment of the invention, the apparatus includes a rigid metal plate, the mounting surface comprising an upper surface of the plate. In a variation, the mounting surface may be the exposed surface of a concrete slab.

In the case of the metal plate, the plate is preferably at least about twelve feet long so as to accommodate tires having a diameter of about four feet. The preferred width of the plate is at least about eight feet so as to accommodate most large tractor and trailer vehicles (e.g., 18 wheelers). The plate is preferably formed of iron or steel and has a thickness of at least about one-half inch.

Still in the case of the use of a metal plate, the transverse length of the ribs is at least about the same as the width of said plate. In any event, at least most of the ribs have a height above the mounting surface of about two inches, in which case, the spacing between at least most of the ribs is about eight inches.

Again in the preferred embodiment in which the apparatus includes a metal plate, the plate may be formed in first and second (or more) longitudinal sections for ease in portability. The apparatus then includes means for detachably attaching the first and second sections of plates together. Preferably, the ribs are mounted to the first and second sections of plate such that two ribs are in abutment when the first and second plate sections are abutted to form a continuous plate and wherein the means for detachably attaching the first and second plate sections together include a plurality of pins extending through the two abutting ribs.

There is consequently provided an effective yet relatively economical and time efficient apparatus forcing dirt and rock to be removed from vehicle tires, especially from the tires of trucks that are used both off-road and on public streets and highways.

BRIEF DESCRIPTION OF THE DRAWINGS

The present invention can be more readily understood by a consideration of the following detailed description when taken in conjunction with the accompanying drawings, in which.

In the various FIGS. identical elements and features are given the same reference number.

DETAILED DESCRIPTION OF THE INVENTION

Figure 1:
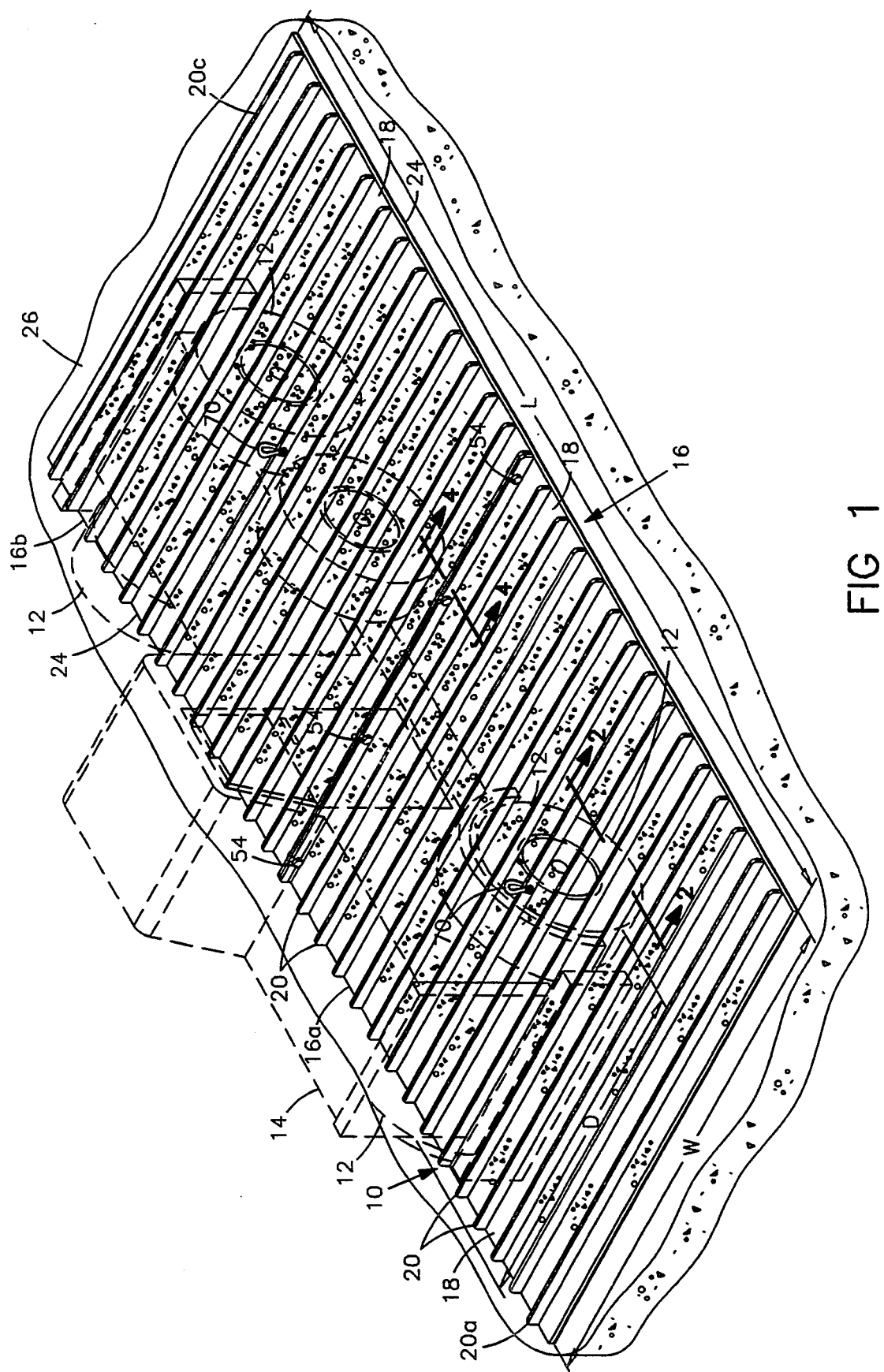
FIG. 1 is a perspective drawing of a truck tire cleaning apparatus in accordance with the present invention, showing a large rectangular, rigid plate having a number of upwardly projecting, transverse ribs spaced several inches apart in a longitudinal direction, the ribs being spaced and sized for causing truck tire treads to deflect and dislodge rocks and stones as a truck is driven over the apparatus.

There is shown in FIG. 1 an apparatus or device 10 for enabling the removing of dirt and rocks (stones and gravel) from tires 12 (shown in phantom lines) of a truck 14 (also shown in phantom lines) driven longitudinally over the apparatus. As shown, and more particularly described below, apparatus 10 comprises a rigid metal plate 16 that is preferably made from sheet steel or iron alloy. Fixed to an upper surface 18 of plate 16 is a number of upright ribs 20, there being shown, by way of example eighteen of such ribs. Ribs 20 are fixed transversely across plate 16 in a mutually spaced-apart, parallel manner.

Figure 2:
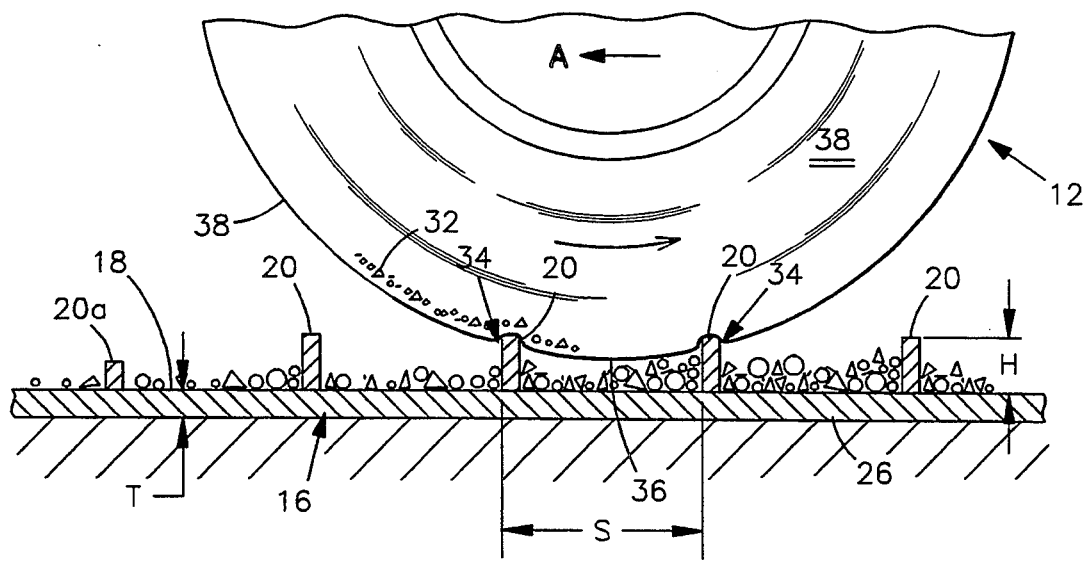
FIG. 2 is a longitudinal cross sectional drawing looking along line 2—2 of FIG. 1, showing the manner in which a truck tire deflects as the tire rolls over the ribs of the apparatus.

Plate 16, as shown, is preferably rectangular in shape, having a longitudinal length, L, a transverse width, W, and a thickness, T (FIGS. 1 and 2). Plate dimensions L, W and T are dependent upon the size and loaded weight of the vehicle apparatus 10 is intended to be used with.

In this regard, length, L, of plate 16 is selected to be at least equal to the peripheral distance around tire 12 so that the tire will make at least one full revolution as it rolls longitudinally over apparatus 10 as the associated truck (or vehicle) 14 is driven over the apparatus. Width, W, of plate 16 is selected to be significantly wider than the overall distance, D, from outside to outside of truck tires 12 (FIG. 1) so that truck 14 can be driven longitudinally over apparatus 10 without much risk that the tires will roll off side edges 24 of the plate as the truck is driven over the apparatus. Thickness, T, of plate 16 is sufficient to bear the loaded weight of the vehicle for which apparatus is designed for use without bending or buckling when the plate is resting on relatively solid, level ground 26 (FIG. 2).

By way of specific example, with no limitation being intended or implied, when apparatus 10 is designed for use by conventional, fully-loaded semi- tractors and trailers having tires 12 that are about forty inches in diameter, the length, L, of plate 16 is selected to be at least about ten feet and the width, W, of the plate is at least about eight feet. Thickness of plate 16, assuming that the plate is made of hardened steel, is preferably about one-half inch. Total weight of plate 16 having such dimensions and made of hardened steel is nearly a ton. Plates 16 for smaller vehicles can, of course, be made proportionally smaller.

As shown in FIG. 1 for illustrative purposes, all of ribs 20, except two end ribs 20a are the same height, H, above mounting surface 18 of plate 16 (FIG. 2). Ribs 20 are longitudinally spaced apart a uniform center-to-center spacing, S FIGS. 3A, 3B and 3C. End ribs 20a may have a height less that the height, H, of intermediate ribs 20 so that a truck being driven onto apparatus 10 from either longitudinal direction is less likely to skid the apparatus along ground 26. Ends of ribs 20 may be rounded off so as to eliminate sharp corners that might cut tires 12 of the tires are unintentionally run off the ends of the ribs.

Ribs 20 and 20a are formed having a thickness, t, that prevents bending or buckling of the ribs as tires 12 are driven over them. On the other hand, rib thickness, t, is preferably not much thicker than needed for strength and rigidly in order to keep down the weight of apparatus 10. Typically for ribs 20 constructed from hardened steel, the thickness, t, of the ribs is preferably between about one-quarter inch and one-half inch.

Height, H, of ribs 20 and the longitudinal spacing, S, between adjacent ribs are cooperatively selected so that when tire 12 rolls over the ribs in a longitudinal direction (Arrow A, FIG. 2) and tire tread 32 is flexed or distorted upwardly in regions 34 over each contacted rib, a section 36 of a peripheral (pavement-engaging) surface 38 of the tire is sufficiently far above plate surface 18 that dirt and rocks that have fallen or are falling onto the plate surface between contacted ones of the ribs are not picked back up by the tire tread. By way of example, for use with typical semi-truck tires that are about forty inches in diameter, height, H, of ribs 20 may be about two inches and the spacing, S, between the ribs is about eight inches. In this example, end ribs 20a may be only about one inch high to facilitate rolling of truck tires 12 onto apparatus 10 without skidding the apparatus along the ground.

As can be appreciated, when tires 12 roll over ribs 20 and tire treads 32 flex or distort in regions 34 over the ribs, the treads tends to flex open and rocks and dirt lodged in the treads become dislodged and fall onto plate 16 between the ribs. Dirt on sidewall regions 38 of tires 12 is also dislodged as tire treads 32 flex in regions 34 over ribs 20. Thus, Apparatus 10 is very effective in rapidly and economically dislodging dirt and rocks from tires 12, with no manual labor usually being required.

Figure 3A:
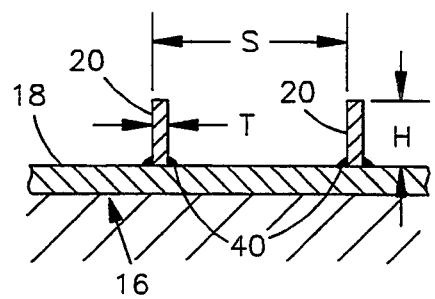
FIGS. 3A, 3B and 3C are side view drawings of the apparatus, looking generally in the direction of line 2—2 of FIG. 1 showing several methods of construction, FIG. 3A showing the transverse ribs welded to a bottom plate, FIG. 3B showing the transverse ribs formed of angle irons that are bolted to the bottom plate, and FIG. 3C showing adjacent pairs of the transverse ribs being formed of a steel U-channel that is bolted to the bottom plate.
Figure 3B:
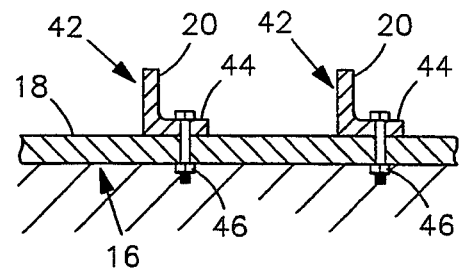
Figure 3C:
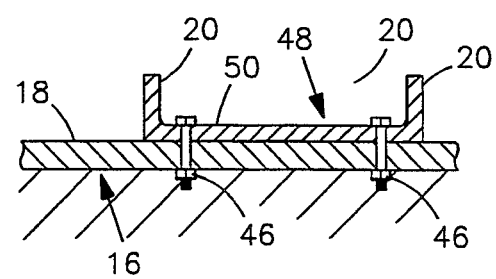

Ribs 20 and 20a may be formed and fixed to plate 16 in several ways, some of which are depicted in FIGS. 3A, 3B and 3C. As shown in FIG. 3A, ribs 20 are formed of steel strips that are welded along bottom edge regions 40 to upper surface 18 of plate 16.

FIG. 3B depicts ribs 20 as comprising an upstanding legs of steel angles 42. As depicted, a horizontal leg 44 of each angle 42 is attached to plate upper surface 18 by a number of bolts 46 (only one of which is shown). Alternatively, angles 42 can be welded to plate surface 18 instead of being bolted to plate 16.

In a third variation depicted in FIG. 3C, an adjacent pair of ribs 20 are formed as vertical legs of a single C-channel 48, a central region 50 of which is bolted to plate 16 by a number of bolts 46. Channels 48 can alternatively be welded to plate upper surface 18.

As mentioned above, an eight foot by twelve foot steel plate 16 that is about one-half inch thick weighs nearly a ton. With about eighteen two inch ribs 20 attached to plate 16, the weight of apparatus 10 is further increased by several hundred pounds. Such high weight of apparatus 10 is advantageous in that the apparatus is not easily skidded around when trucks pass over. A disadvantage of such weight, however, is that apparatus 10 is difficult to transport from one off-road work site to another, as may sometimes or frequently be needed.

It may, therefore, be advantageous to construct plate 16 of at least two sections, for example, first and second sections 16a and 16b, respectively, (FIG. 1) that are pinned (or bolted) together to form a "full-sized" plate. As an illustrative example, to construct an eight by twelve foot plate 16, each section 16a and 16b may be about eight feet wide and about six feet long. For transportation of apparatus 10, sections 16a and 16b—each of which weighs only one-half as much as apparatus 10 when assembled—are separated and are moved individually to the new work site. At the new work site, sections 16a and 16b are reconnected together to form a complete apparatus 10.

Figure 4:
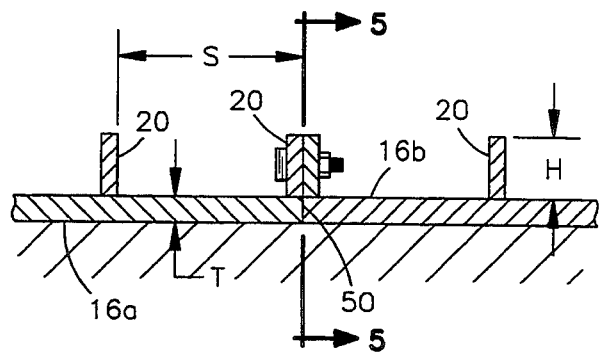
FIG. 4 is a longitudinal cross sectional drawing looking along line 4—4 of FIG. 1 showing a representative one of several interconnections between two sections of the apparatus whereby the apparatus can be more easily be moved from site to site.
Figure 5:
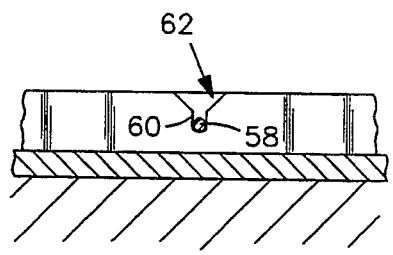
FIG. 5 is a transverse cross sectional drawing looking along line 5—5 of FIG. 4 showing features of the interconnection between the two apparatus sections.
Figure 6:
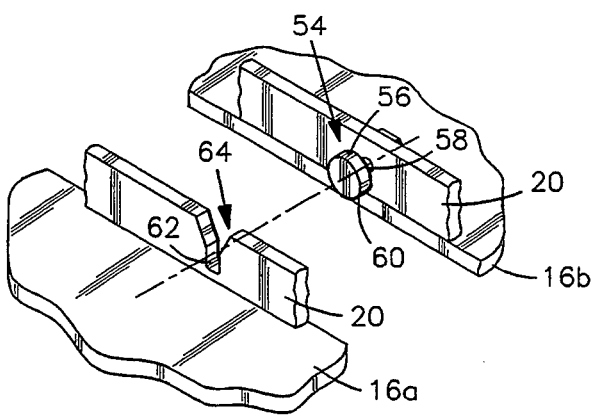
FIG. 6 is a partial perspective drawing showing additional details of the interconnection between the two apparatus sections.

FIGS. 4-6 illustrate one convenient manner for detachably connecting plate sections 16a and 16b together. As shown, plate sections 16a and 16b are constructed with a rib 20 at their respective transverse interconnect ends 50 and 52 so that when the plate ends are butted together to form plate 16, the end ribs 20 abut one another (FIG. 4).

Although the abutting end ribs 20 of plate sections 16a and 16b could be bolted together to interconnect the two plate sections, it is preferable that a means 54 is provided whereby plate sections 16a and 16b can be quickly disconnected from one another and can be quickly reconnected to one another. Are over, it would be expected that the use of bolts to connect end ribs 20 together would, in time, become difficult to remove because of become rusty and/or distorted by continual use of apparatus which would apply heavy loads to the bolts and possibly distort or bend them.

As best seen in FIG. 6, means 50 comprise a pin 56 having a short shaft 58 and a head 60. Shaft 58 extends head 60 longitudinally outwardly from the end rib 20 to which the shaft is fixed. In this regard, shaft 58 may be threaded into its rib 20 and may be welded in place. Shaft 56 extends head 58 a distance slightly greater than the thickness, t, of rib 20.

The abutting one of ribs 20 is formed having a generally U-shaped slot 62 extending down toward plate upper surface 18 in longitudinal alignment with pin 54. The width of slot 62 is somewhat greater than the diameter of pin shaft 56, but is smaller than the diameter of width of head 58. An entrance region 64 in rib 20 to slot 62 is formed in a broad V-shape. By such means, second plate section 16b is detachably connected to first plate section 16a by lowering the second plate section such that pin shaft 58 is received into slot 58 in the adjacent rib 20 of the first plate section. The V-shaped entry to slot 62 enables shaft 58 to be easily inserted into the slot, it being understood that plate section 16b is very heavy and is difficult to maneuver precisely.

Although only one inter connecting means 54 has been shown and described relative to FIGS. 4-6, it will be appreciated that several such interconnect means will normally be required, four such means being shown in FIG. 1. It is also to be appreciated that although plate 16 has been shown and described as being advantageously constructed from two plate sections 16a and 16b, the plate may be constructed of more than two sections, for example, three or four sections, all of which are interconnected in the above-described manner.

Figure 7:
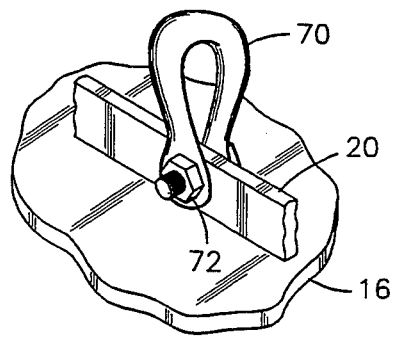
FIG. 7 is a partial perspective drawing showing the installation of a clevis whereby the individual sections of the apparatus can be lifted for moving the apparatus from site to site.

Plate sections 16a and 16b can be lifted and moved about in any convenient manner. As shown by way of example in FIG. 7, a clevis 70 (or more than one clevis) may be bolted to one of ribs 20 by a bolt 72 in a central region of plates 16a and 16b to enable lifting of the late sections and its attached ribs. Clevis 70 may be removed after plate sections 16a and 16b are positioned in place or may be left in place.

Understandably there are important advantages to mounting ribs 20 onto plate 16 or sections of the plate, such as sections 16a and 16b. Apparatus 10 can then be readably moved from one site to another and can be used to advantage on relatively small construction jobs, such as excavation on city streets or street repaving or resurfacing sites, all of which may be sources of dirt and rocks that can be picked up by tire treads.

Figure 8:
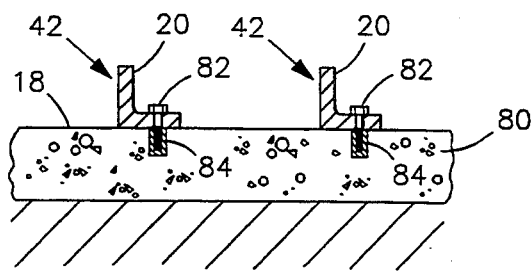
FIG. 8 is a transverse cross sectional drawing similar to FIG. 3B, but showing the transverse angles bolted to bolt anchors set into a concrete slab instead of being bolted to a steel plate.

On the other hand, there may be sites, such as large sand and/or gravel pits, where a permanent installation of apparatus 10 may be appropriate. In such case, as depicted in FIG. 8, ribs 20 can be mounted directly to a fixed concrete slab 80. For this type of installation, ribs 20 advantageously comprise angles, such as above-described angles 42 (FIG. 3B) which are bolted, by bolts 82 into anchors 84 set into slab 80. Ribs 20 may otherwise be the same size and have the same spacing as described above relative to FIGS. 1-3.

Although there have been described and illustrated a tire cleaning apparatus and variations thereof in accordance with the present invention for purposes of illustrating the manner in which the invention may be used to advantage, it is to be appreciated that the invention is not limited thereto. Therefore, any and all variations and modifications that may occur to those skilled in the art are to be considered as being within the scope and spirit of the claims as appended hereto.

What is claimed is:

1. An apparatus for removing dirt and rocks from the tires of trucks and other vehicles, said apparatus comprising:
   a. a number of elongate, rigid metal ribs;
   b. first and second rigid plate sections;
   c. means for attaching said ribs to an upper surface of said first and second plate sections in a mutually parallel orientation transversely across said plate sections and in a longitudinally spaced-apart manner, the longitudinal spacing between the ribs, taken in conjunction with the height of the ribs relative to said surface, preventing the peripheral surface of a tire rolling over the apparatus in a longitudinal direction from contacting said mounting surface; and
   d. means for detachably connecting the first and second plate sections together in end to end relationship so as to form a large plate, said plates being connected so that all of said ribs attached to the first and second plate sections are mutually parallel, wherein said first and second plates are connected together, the composite plate formed thereby being about twelve feet long and about eight feet wide, and wherein the means for detachably connecting said first and second plate sections together includes a plurality of pins that extend through both of said ribs attached to the ends of said first and second plate sections.

2. An apparatus for removing dirt and rocks from the tires of trucks and other vehicles, said apparatus comprising:
   a. a number of elongate, rigid metal ribs;
   b. a rigid metal plate which comprises first and second longitudinal plate sections and including means for detachably attaching the first and second sections of plates together; and
   c. means for attaching said ribs to an upper surface of said plate in a mutually parallel orientation transversely across said plate and in a longitudinally spaced-apart manner, the longitudinal spacing between the ribs, taken in conjunction with the height of the ribs relative to said surface, preventing the peripheral surface of a tire rolling over the apparatus in a longitudinal direction from contacting said mounting surface, the ribs being mounted to the first and second plate sections so that two ribs are in abutment when the first and second plates are abutted to form a continuous plate, the means for detachably attaching the first and second plate sections together including a plurality of pins extending through said two abutting ribs.

* * * * *